US010267933B2

(12) United States Patent
Drange

(10) Patent No.: US 10,267,933 B2
(45) Date of Patent: Apr. 23, 2019

(54) AUXILIARY DEVICE COMMUNICATION

(71) Applicant: PGS Geophysical AS, Oslo (NO)

(72) Inventor: Geir Andre Motzfeldt Drange, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/794,047

(22) Filed: Oct. 26, 2017

(65) Prior Publication Data

US 2018/0172855 A1 Jun. 21, 2018

Related U.S. Application Data

(60) Provisional application No. 62/434,746, filed on Dec. 15, 2016.

(51) Int. Cl.
*G01V 1/20* (2006.01)
*G01V 1/22* (2006.01)
*B63B 21/56* (2006.01)
*G08C 19/00* (2006.01)
*H04Q 9/00* (2006.01)
*G01V 1/38* (2006.01)
*H04B 3/36* (2006.01)

(52) U.S. Cl.
CPC .............. *G01V 1/201* (2013.01); *B63B 21/56* (2013.01); *G01V 1/3826* (2013.01); *G08C 19/00* (2013.01); *H04B 3/36* (2013.01); *H04Q 9/00* (2013.01); *G01V 1/202* (2013.01); *G01V 1/22* (2013.01); *G01V 1/38* (2013.01); *G01V 2210/1423* (2013.01); *G08C 2201/20* (2013.01); *G08C 2201/40* (2013.01); *H04Q 2209/30* (2013.01); *H04Q 2209/88* (2013.01)

(58) Field of Classification Search
CPC ........ G01V 1/201; G01V 1/3808; G01V 1/28; G01V 1/22; G01V 1/3826; H04B 3/36
See application file for complete search history.

(56) References Cited

U.S. PATENT DOCUMENTS 6,292,436 B1* 9/2001 Rau ........................ G01V 1/201
114/245
8,120,507 B2 2/2012 Rouquette et al.
2003/0117025 A1* 6/2003 Rouquette .............. G01V 1/201
307/147

(Continued)

FOREIGN PATENT DOCUMENTS

EP 2869091 5/2015
EP 3018498 5/2016

OTHER PUBLICATIONS

European Extended Search Report for related EP Application 17206964.3, Received May 11, 2018 and dated May 16, 2018 (8 pgs).

*Primary Examiner* — Mirza F Alam

(57) ABSTRACT

A system may include a message server. The system may include a telemetry unit in communication with the message server. The telemetry unit may be configured to discover an identification of an auxiliary device coupled thereto. The telemetry unit may be configured to report the identification to the message server. The telemetry unit may be configured to request the message server to send messages associated with the identification to the telemetry unit. The telemetry unit may be configured to forward the messages to the auxiliary device.

22 Claims, 3 Drawing Sheets

(56) References Cited

U.S. PATENT DOCUMENTS

| | | | |
|---|---|---|---|
| 2003/0147360 A1* | 8/2003 | Nero | E21B 47/12 370/314 |
| 2010/0172207 A1* | 7/2010 | Gulbransen | G01V 1/201 367/19 |
| 2010/0245119 A1* | 9/2010 | Rouquette | H04B 3/36 340/850 |
| 2012/0081994 A1 | 4/2012 | Husom et al. | |
| 2013/0311140 A1 | 11/2013 | Schechter | |
| 2015/0346366 A1* | 12/2015 | Mellier | G01V 1/201 367/15 |
| 2016/0109588 A1* | 4/2016 | Mellier | G01V 1/201 367/17 |

* cited by examiner

AUXILIARY DEVICE COMMUNICATION

REFERENCE TO RELATED APPLICATIONS

This application claims priority to U.S. Provisional Application 62/434,746, filed Dec. 15, 2016, which is incorporated by reference.

BACKGROUND

Marine survey techniques may be utilized to yield knowledge of subterranean formations beneath a body of water in order to find and extract valuable mineral resources, such as oil. For a typical marine survey, a marine survey vessel tows equipment. Towable equipment may include one or more sources below the surface of the water and over a subterranean formation to be surveyed for mineral deposits. Receivers may be located on or near the seafloor or may be towable equipment on one or more streamers that can be towed by the same marine survey vessel that tows the sources or on one or more streamers that can be towed by another marine survey vessel.

DETAILED DESCRIPTION

Figure 1:
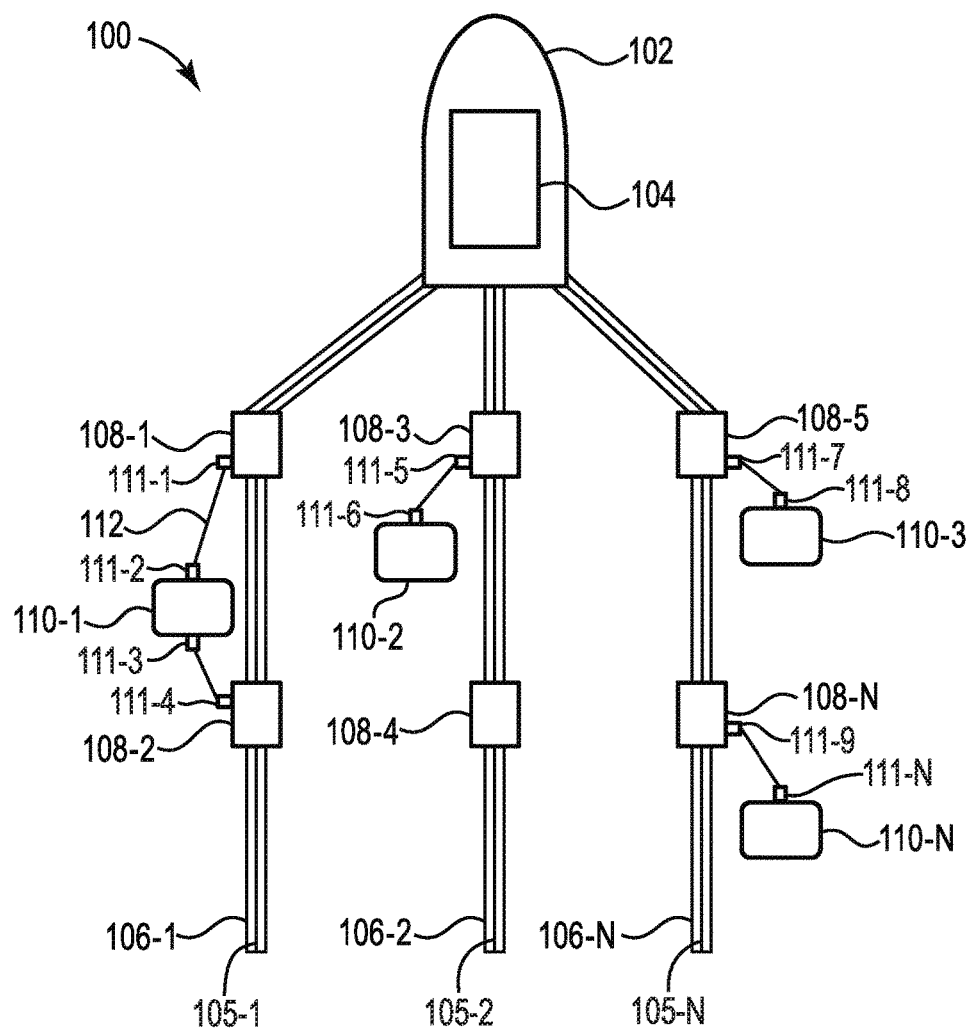
FIG. 1 illustrates a block diagram of an overhead view of a portion of a marine survey system.

The present disclosure is related generally to the field of marine surveying. Marine surveying can include, for example, seismic or electromagnetic surveying, among others. This disclosure may have applications in marine surveying, in which one or more sources are used to generate wavefields, and receivers—either towable or ocean bottom—receive energy generated by the sources and affected by the interaction with a subsurface formation. The receivers thereby collect survey data which can be useful in the discovery and extraction of hydrocarbons from subsurface formations. In particular, the present disclosure is related to establishing communication between in-sea auxiliary devices associated with towable equipment and control components, such as control components aboard a marine survey vessel, without a priori knowledge of the auxiliary device and its function by electronics components such as telemetry units of the towable equipment.

Marine surveying may include utilizing a marine survey vessel to perform a portion of the marine survey. A marine survey vessel, such as a watercraft, may be used to house and tow components for marine surveying. As used herein, the term aboard is used to refer to a component that is housed on the marine survey vessel and is not a component that is placed in the water or towed through the water. As used herein, the term "in-sea" refers to a component that is placed in the water and towed from the marine survey vessel. "In-sea" may also refer to a component that is transported by and stowed on the marine survey vessel. The in-sea component can be designed to be deployed on or in the water.

Marine survey vessels can tow equipment. Towable equipment can include one or more of a source, a receiver, an auxiliary device, and a streamer. A source can be a device that releases energy into the earth in the form of waves and may be impulsive or non-impulsive. Non-impulsive sources differ from impulsive sources in that they transmit energy for an extended period of time, as compared to impulsive sources, which transmit energy for a short period of time. For instance, non-impulsive sources transmit energy near-continuously or continuously, while impulsive sources transmit energy in a short period of time. As used herein, "near-continuous" includes without meaningful breaks. As would be understood by one of ordinary skill in the art with the benefit of this disclosure, operational circumstances can cause intermittent gaps (due to equipment failure, etc.). "Near-continuous" can be transmission with intermittent or periodic gaps, whether planned or unplanned, as well as without intermittent or periodic gaps, thus including "continuous transmission." An example of a non-impulsive source is a marine vibrator. An example of an impulsive source is an air gun.

An example of a receiver is a seismic receiver such as a hydrophone or geophone, however embodiments are not limited to these examples. An example of a receiver is an electromagnetic receiver. A receiver can include a sensor. Examples of sensors include a particle displacement sensor, a particle velocity sensor, an accelerometer, and a pressure gradient sensor. The receivers can receive in-sea information including the returning energy released from the source and reflected off subsurface formations. The receivers can receive in-sea information such as acceleration readings associated with the receiver.

An auxiliary device can be an in-sea add-on component that supports the operation of the other marine survey equipment being utilized in a marine survey operation. An auxiliary device can be coupled to towable equipment. A plurality of auxiliary devices can be utilized in a marine surveying operation. Each of the auxiliary devices can be coupled to and in communication with a telemetry unit on respective towable equipment. Examples of auxiliary devices include acoustic positioning devices, towable equipment steering devices, tension measurement devices, and speed-of-sound devices. Different types of auxiliary devices can be utilized in a marine survey operation to receive, store, and generate auxiliary data. The auxiliary devices may be manufactured by a plurality of different manufacturers, have distinct communication protocols, be controlled by distinct applications, and utilize distinct sources of electric power and data transmission along a streamer separate from a main streamer telemetry cable.

A streamer is a marine cable assembly that can include the receivers and electrical or optical connections to transmit information collected by the receivers to the marine survey vessel. The streamers and receivers can be arranged in a spread. The spread is the geometrical pattern of receivers relative to a source. The output from an actuation of a source may be recorded simultaneously by the receivers during the marine survey. Example spread geometries include in-line offset, L-spread, split-spread, and T-spread.

An example of a length of the streamers is ten kilometers. However streamers can be longer or shorter for a given marine survey. A streamer can include streamer sections. For example, a streamer can include a plurality of seventy-five to one hundred fifty meter long streamer sections. Each streamer section can include a plurality of receivers. The receivers can convert the in-sea information into signals, which can be analog or digital signals, to be transmitted to the marine survey vessel for recording or processing. The receivers can transmit the data utilizing a main streamer telemetry cable (e.g., fiber, copper, etc.) running through the streamer between the marine survey vessel and the receivers.

A streamer can include a telemetry unit. The telemetry unit is an in-sea device located on a streamer that can be coupled to an auxiliary device. A streamer (or a plurality of streamers) can include a plurality of telemetry units, which can be coupled in a network. According to at least one embodiment of the present disclosure, a telemetry unit can have detailed knowledge of the auxiliary device coupled thereto. For example, the telemetry unit can have knowledge of a communication protocol of the auxiliary device and can receive a command from a controller, interpret and translate the command to a different command understandable and executable by the auxiliary device, and transmit the different command to the auxiliary device. As such, telemetry units can utilize processing resources, persistent updates, and storage of data related to various communication protocols to facilitate control of different auxiliary devices. Further, an auxiliary device and a controller can be configured to interface with a telemetry unit. In at least one embodiment, the controller can be aboard a marine survey vessel.

In at least one embodiment of the present disclosure, a telemetry unit can be associated with a source. For example, the telemetry unit can be part of or coupled to and in communication with a source. The telemetry unit can be coupled to an auxiliary device that is associated with the source. The source and the auxiliary device can be configured to communicate with the telemetry unit. The controller can be configured to communicate with the telemetry unit and communicate with the source or the auxiliary device through the telemetry unit.

The controller can send control commands to the receivers and receive status data and digitized in-sea information from the receivers. The controller can execute a plurality of applications. Each application can be instructions executable by a processor to control and communicate with a receiver or an auxiliary device. The controller can facilitate communicating the commands from the applications to the corresponding receivers or telemetry units associated with auxiliary devices. As described above, communications between the controller and the auxiliary device can be translated through a telemetry unit.

In at least one embodiment of the present disclosure, communication between in-sea auxiliary devices and the controller can utilize a telemetry unit as a relay therebetween. As such, a message server can relay messages between applications associated with the controller and an auxiliary device via the telemetry unit. The message server can relay a message without knowledge of the contents of the message. In at least one embodiment, the message server can be aboard the marine survey vessel.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 304 in FIG. 3. Multiple analogous elements within one figure may be referenced with a reference numeral followed by a hyphen and another numeral or a letter. For example, 110-1 may reference element 10-1 in FIG. 1 and 110-2 may reference element 10-2, which can be analogous to element 10-1. Such analogous elements may be generally referenced without the hyphen and extra numeral or letter. For example, elements 110-1 and 110-2 may be generally referenced as 110. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates a block diagram of an overhead view of a portion of a marine survey system 100. The marine survey system 100 can include a marine survey vessel 102. Equipment can be positioned aboard the marine survey vessel 102. For example, the equipment can include a message server 104. Although not specifically illustrated, the equipment can include a controller and applications associated with the controller.

The marine survey system 100 can include towable equipment. As used herein, towable equipment can be equipment that is configured to be towed from the marine survey vessel 102. For example, towable equipment can include connections configured to be secured to the marine survey vessel 102 or to a line coupled to the marine survey vessel 102. However, towable equipment can be stored on the marine survey vessel 102 or be completely separate from the marine survey vessel 102. The towable equipment can be the equipment utilized to perform a marine survey. Examples of the towable equipment include cabling, streamers 106-1, 106-2, . . . 106-N, sources, receivers, digitizers, and auxiliary devices 110-1, 110-2, 110-3, . . . , 110-N.

The marine survey system 100 can include telemetry units 108-1, 108-2, 108-3, 108-4, 108-5, . . . , 108-N. The telemetry units 108 can be located on the towable equipment. For example, the telemetry units 108 can be located on, in-line with, or coupled to a streamer 106 or a source. The telemetry units 108 can be included in a network of telemetry units 108. Each telemetry unit 108 can be coupled to a distinct portion of the towable equipment and be in communication with auxiliary devices 110 associated with the distinct portion of the towable equipment.

The marine survey system 100 can include auxiliary devices 110 coupled to telemetry units 108. For example, as illustrated in FIG. 1, an auxiliary device 110-2 is coupled to a telemetry unit 108-3. The marine survey system 100 can include a connection 112, such as an optical or electrical connection, between auxiliary devices 110 and telemetry units 108. The connection 112 between auxiliary devices 110 and telemetry units 108 can utilize a common communication interface, such as common communication interfaces 111-1, 111-2, 111-3, 111-4, 111-5, 111-6, 111-7, 111-8, 111-9, . . . , 111-N, between the two. The common communication interface 111 is a standardized interface. An example of the common communication interface 111 is a controller area network (CAN) interface, however embodiments are not so limited. A common communication interface 111 can be an interface to accept a connection 112 that is the same or complimentary between the auxiliary devices 110 and the telemetry units 108. The common communication interface 111 can conform to a standard defining the electrical or optical characteristics of drivers and receivers for use in communication, such as RS-485. The connection 112 can be a physical communication pathway, such as a section of cable. The common communication interface 111 may include a terminal of the section of cable and a terminal of the auxiliary device 110 or the telemetry unit 108 coupled thereto. An auxiliary device 110 can be coupled to more than one telemetry unit 108. For example, as illustrated in FIG. 1, an auxiliary device 110-1 is coupled to a first telemetry unit 108-1 and a second telemetry unit 108-2. The telemetry units 108 can include a common communication interface 111 configured to be coupled to a plurality of auxiliary devices 110.

The marine survey system 100 can include a communication link between the marine survey vessel 102 and a telemetry unit 108. In at least one embodiment of the present disclosure, the communication link can communicatively connect the message server 104 with the telemetry units 108. The communication link can be partially or fully within a body of a streamer 106. The message server 104 can be a computing device including instructions executable by a processor. For example, the message server 104 can include processing resources and memory resources coupled to the processing resources and storing instructions executable by the processing resources to perform the various functions described below. In at least one embodiment of the present disclosure, the message server includes instructions executable by the processor to act as middleware, handling messages that are sent between telemetry units 108 or auxiliary devices 110 and equipment or auxiliary applications. In at least one embodiment, the message server 104 is located aboard the marine survey vessel 102.

A telemetry unit 108 can be initialized with equipment aboard the marine survey vessel 102 or elsewhere. Initialization can include an electronic handshake between the telemetry unit 108 and the equipment whereby attributes are assigned and communicated between the telemetry unit 108 and the equipment. For example, initializing the telemetry unit 108 with the equipment may include the telemetry unit 108 electronically identifying itself and its position to the equipment and the equipment assigning a position indicator to each telemetry unit 108. Examples of position include geographic coordinates and physical location relative to other towable equipment such as streamers 106, sources, and telemetry units 108. Examples of position indicators include a number, a string of numbers, an indication of a source that the telemetry unit is located on, an indication of streamer 106 that the telemetry unit 108 is located on, an indication of a section of streamer 106 in a multi-section streamer 106 that the telemetry unit 108 is located on, an indication of a portion of a streamer 106 that the telemetry unit 108 is located on, and an indication of a location of the telemetry unit 108 within a network of telemetry units.

An auxiliary device 110 can include and be associated with an identification. An auxiliary device 110 can be assigned the identification during its manufacture. For example, an identification such as a make, model, or serial number of the auxiliary device 110 can be assigned to the auxiliary device 110 during its manufacture. The identification can be represented as a string of bits. The identification can be unique or non-unique. As an example of a non-unique identification, an auxiliary device 110 such as an acoustic positioning unit can have an identification such as "APU" associated with it. In another example, an auxiliary device 110 such as a tension monitoring unit can have an identification such as "TMU" associated with it. The identification can be associated with the auxiliary device 110 in order to identify a type of the auxiliary device 110. A type of an auxiliary device 110 may include a category of the auxiliary device 110 as defined by a function associated with the auxiliary device 110. Examples of device types include acoustic positioning device type, towable equipment steering device type, tension measurement device type, and speed-of-sound device type. The identification may not be assigned or formatted by a manufacturer in order to communicate any association of the auxiliary device 110 with another component of the marine survey system 100. In at least one embodiment of the present disclosure, each auxiliary device 110 can have a unique identification, such as a serial number.

The auxiliary device 110 can be configured to report its associated identification to a telemetry unit 108. For example, the auxiliary device 110 can report its associated identification to the particular telemetry unit or telemetry units that it is coupled to. In at least one embodiment of the present disclosure, the auxiliary device 110 can report its associated identification to a coupled telemetry unit 108 responsive to power being applied to the auxiliary device 110. Power being applied to the auxiliary device 110 can include initiating the supply of electricity to power the functions of the auxiliary device 110, exiting a standby mode, or entering a full functionality powered up mode. Reporting the identification associated with the auxiliary device 110 can include reporting a string of bits making up the identification to the telemetry unit 108 that the auxiliary device 110 is coupled to.

The telemetry unit 108 can be configured to discover an identification associated with an auxiliary device 110 coupled thereto. For example, the telemetry unit 108 can be configured to detect the identification of the auxiliary device 110 or receive the identification of the auxiliary device 110. The auxiliary device 110 can report the identification to the telemetry unit 108 responsive to power being applied to the auxiliary device 110.

Once the telemetry unit 108 has discovered the identification associated with the auxiliary device 110, the telemetry unit 108 can report the identification associated with the auxiliary device 110 to the equipment. In at least one embodiment of the present disclosure, the telemetry unit 108 can generate an auxiliary device found report upon discovering the identification associated with the auxiliary device 110. The auxiliary device found report can include the identification associated with the auxiliary device 110 and the position indicator assigned to the reporting telemetry unit 108. The telemetry unit 108 can communicate the auxiliary device found report to the message server 104.

The message server 104 can be responsible for handling messages for the auxiliary devices 110. A message can be a command being sent from equipment, such as equipment aboard the marine survey vessel 102, to a particular auxiliary device 110. For example, a message can be a command from an auxiliary device application running on the message server 104 to a particular auxiliary device 110. A message identification can be an identification associated with the auxiliary device 110 that the message is being addressed to. A message identification can be an identification associated with a destination auxiliary device 110. The telemetry unit 108 may have no knowledge and information regarding the function and messaging format of a coupled auxiliary device 110. The telemetry unit 108 can request that the message server 104 forward, to the telemetry unit 108, messages for the auxiliary devices 110 that are coupled to the telemetry unit 108. Alternatively, the telemetry unit 108 can request that the message server 104 forward, through the telemetry unit 108, messages for the auxiliary devices 110 that are coupled to the telemetry unit 108 to the auxiliary devices 110. In at least one embodiment of the present disclosure, the telemetry unit 108 can include the request as part of the auxiliary device found report described above.

The message server 104 can, responsive to receiving the forwarding request from the telemetry unit 108, forward a message to the telemetry unit 108 coupled to the auxiliary device 110 identified in the message identification. The message server 104 can identify the message identification and compare it to a list of identifications associated with various auxiliary devices 110. When the message server 104 finds a match between the message identification and a particular identification associated with a particular auxiliary device 110, the message server 104 can forward the message to a particular telemetry unit 108 that is coupled to the particular auxiliary device 110. As described above, a particular telemetry unit 108 coupled to a particular auxiliary device 110 can be identified based on the particular telemetry unit 108 having generated the auxiliary device found report for the particular auxiliary device 110.

The message server 104 can forward a message to an appropriate telemetry unit 108 via the communication link 105-1, 105-2, . . . 105-N. The telemetry unit 108 can, upon receipt of the message, forward the message to the coupled auxiliary device 110. The telemetry unit 108 can forward the message to the auxiliary device 110 without translation, conversion, or any other processing of the contents of the message. In other words, the telemetry unit 108 can act as a relay for the message on its way to the destination auxiliary device 110 and the telemetry unit 108 may not be configured with a protocol of the message that it is relaying.

The auxiliary device 110 can receive the message and act on it. For example, a message can be a command to the auxiliary device 110 to descend to a particular depth. After the telemetry unit 108 forwards the message to the auxiliary device 110, the auxiliary device 110 can descend to the commanded depth. The auxiliary device 110 can generate a response message. The response message can be a response to the command or another type of communication between the auxiliary device 110 and the equipment. For example, the auxiliary device 110 can generate a response message including a confirmation that the auxiliary device 110 has achieved the commanded depth. The auxiliary device 110 can send the response message to the telemetry unit 108. The telemetry unit 108 can forward the message to the message server 104.

The telemetry unit 108 may have no information regarding the contents of the reply message and may not perform any processing of the contents of the reply message. The message server 104 can forward the reply message, without processing the contents thereof, to the appropriate equipment. The message server 104 can identify the appropriate equipment to receive a reply message based on an auxiliary device type registered by the equipment with the message server 104 matching a portion of an identification associated with the auxiliary device 110 that generated the reply message. The message server 104 can identify the identification associated with the auxiliary device 110 that generated the reply message from analysis of the reply message and metadata associated with the reply message. Advantages of this approach can include removing the computational burden of processing, interpreting, routing, and translating messages and reply messages from the telemetry unit 108. A reduction of the computational burden can reduce the cost associated with a telemetry unit 108, can reduce the size of the telemetry unit 108 so that it has less of an impact on the dynamics of the streamers 106, and can free the telemetry unit 108 to control more auxiliary devices 110 with the same resources. Previous approaches involved persistent updating and software additions to telemetry units 108 in order to process, interpret, route, and translate messages for a plurality of auxiliary devices 110 often made by different manufacturers and controlled by distinct applications through distinct communication interfaces.

As described above and as illustrated in FIG. 1, the marine survey system 100 can include a plurality of network coupled auxiliary devices 110. As such, a telemetry unit 108 can be configured to discover a respective identification of each of the plurality of auxiliary devices 110 coupled thereto. The telemetry unit 108 can be configured to report the respective identification to the message server 104. The telemetry unit 108 can be configured to request the message server 104 to send messages associated with the respective identification to the telemetry unit 108. A message can be associated with a particular identification of an auxiliary device 110 when a message identification associated with the message matches the particular identification of the auxiliary device 110. The telemetry unit 108 can be configured to forward messages to one of the auxiliary devices 110 having a matching message identification.

As described above and as illustrated in FIG. 1, the marine survey system 100 can include a plurality of network coupled telemetry units 108. As such, the marine survey system 100 can include not only a first telemetry unit 108-5, but can include a second telemetry unit 108-N coupled to the message server 104. The first telemetry unit 108-5 and second telemetry unit 108-N can be coupled to the message server 104 by a common physical communication link 105-N. A common physical communication link 105-N can be cabling and interfaces that are shared by both the first telemetry unit 108-5 and second telemetry unit 108-N as a connection to the message server 104. A common physical communication link 105-N can include serial or parallel cabling and interfaces between the first telemetry unit 108-5 and the message server 104 and the second telemetry unit 108-N and the message server 104 that consist of substantially the same physical components. The first telemetry unit 108-5 can be configured to discover an identification of a first auxiliary device 110-3. The first telemetry unit 108-5 can be configured to report the identification of the first auxiliary device 110-3 to the message server 104. The first telemetry unit 108-5 can be configured to request the message server 104 to send messages associated with the identification of the first auxiliary device 110-3 to the first telemetry unit 108-5. The first telemetry unit 108-5 can be configured to forward the messages associated with the identification of the first auxiliary device 110-3 to the first auxiliary device 110-3. The second telemetry unit 108-N can be configured to discover an identification of a second auxiliary device 110-N. The second telemetry unit 108-N can be configured to report the identification of the second auxiliary device 110-N to the message server 104. The second telemetry unit 108-N can be configured to request the message server 104 to send messages associated with the identification of the second auxiliary device 110-N to the second telemetry unit 108-N. The second telemetry unit 108-N can be configured to forward the messages associated with the identification of the second auxiliary device 110-N to the second auxiliary device 110-N.

Figure 2:
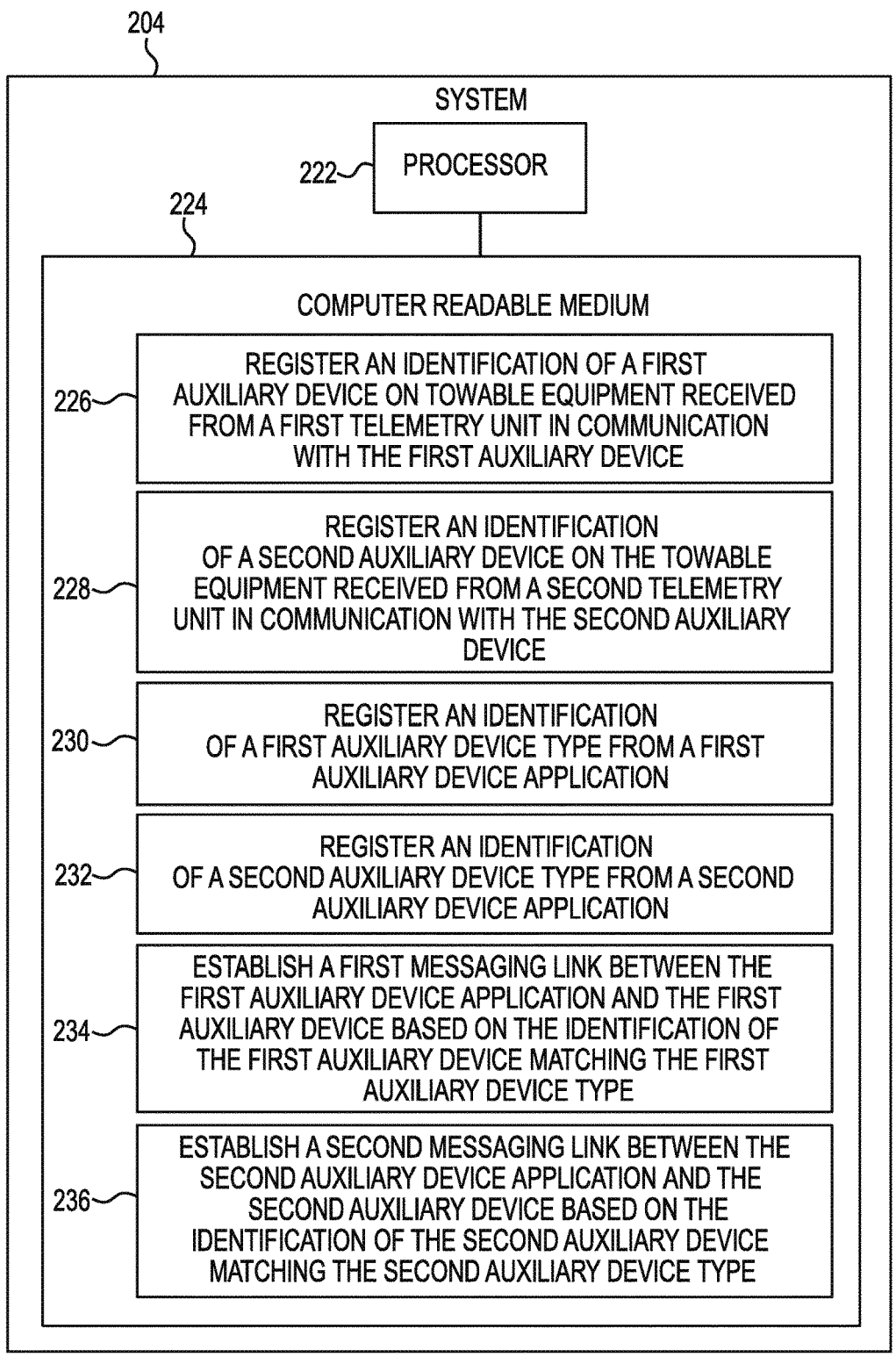
FIG. 2 is a block diagram of a message server.

FIG. 2 is a block diagram of a message server 204. The message server 204 can include at least one computing device that is capable of communicating with at least one remote device. In the example of FIG. 2, the message server 204 includes a processor 222 and a computer-readable medium 224. Although the following descriptions refer to a single processor and a single computer-readable medium, the descriptions can also apply to a system with multiple processors and computer-readable mediums. In such examples, the instructions can be stored across multiple computer-readable mediums and the instructions can be executed across multiple processors.

The processor 222 can be a central processing unit (CPUs), a microprocessor, or other hardware devices suitable for retrieval and execution of instructions stored in the computer-readable medium 224. In the particular example shown in FIG. 2, the processor 222 can retrieve and execute instructions 226, 228, 230, 232, 234, and 236. As an alternative, the processor 222 can comprise an electronic component, such as an application specific integrated circuit, for performing the functionality represented by the instructions stored in the computer-readable medium 224.

The computer-readable medium 224 may be any electronic, magnetic, optical, or other physical storage device that stores executable instructions. Thus, the computer-readable medium 224 may be, for example, Random Access Memory (RAM), an Electrically-Erasable Programmable Read-Only Memory (EEPROM), a storage drive, an optical disc, and the like. The computer-readable medium 224 can be disposed within the message server 204, as shown in FIG. 2. In this situation, the executable instructions can be "installed" on the message server 204. Additionally the computer-readable medium 224 can be a portable, external or remote storage medium, for example, that allows the message server 204 to download the instructions from the portable/external/remote storage medium. In this situation, the executable instructions can be part of an "installation package". As described herein, the computer-readable medium 224 can be encoded with executable instructions 226, 228, 230, 232, 234, and 236.

The instructions 226, when executed by a processor 222, can cause the message server 204 to register an identification of a first auxiliary device. The first auxiliary device can be an auxiliary device coupled to towable equipment. The first auxiliary device can be in communication with and coupled to a first telemetry unit. The identification of the first auxiliary device can be received from the first telemetry unit. The first telemetry unit can be coupled to or incorporated in a streamer or a source. The position of the first telemetry unit within a spread of streamers or sources including a plurality of telemetry units can be registered with the message server.

The instructions 228, when executed by the processor 222, can cause the message server 204 to register an identification of a second auxiliary device. The second auxiliary device can be located on the towable equipment. The second auxiliary device can be in communication with and coupled to a second telemetry unit. The identification of the second auxiliary device can be received from the second telemetry unit. The second telemetry unit can be coupled to or incorporated in a streamer or source. The streamer or source can be the same or different than the streamer or source that the first telemetry unit is coupled to or incorporated with. The position of the second telemetry unit within a spread of streamers or sources including a plurality of telemetry units can be registered with the message server.

The instructions 230, when executed by the processor 222, can cause the message server 204 to register an identification of a first auxiliary device type from an auxiliary device application. Auxiliary device applications can be executed by a controller, such as a controller aboard the marine survey vessel. For example, the auxiliary device applications can run on a message server 204. Auxiliary device applications can include instructions executable by a processor to send commands to and receive responses from a particular auxiliary device or a particular type of auxiliary device. When an auxiliary device application begins to run it can register the auxiliary device and/or type of auxiliary device that it is configured to command with the message server. The auxiliary device application can register the auxiliary device type utilizing an identification associated with a particular auxiliary device type or a particular auxiliary device that the application is configured to generate commands to. For example, an auxiliary device application can be provided by instructions executed by a processor to cause a particular type of auxiliary device to perform an associated function.

The instructions 232, when executed by a processor 222, can cause the message server 204 to register an identification of a second auxiliary device type received from a second auxiliary device application. The identification of the second auxiliary device type can be an identification of a different type of auxiliary device from the identification of the first auxiliary device type. As such, the message server can include a registry of distinct auxiliary device types associated with distinct auxiliary device applications.

The instructions 234, when executed by a processor 222, can cause the message server 204 to establish a first messaging link between the first auxiliary device application and the first auxiliary device to be controlled. Establishing the first messaging link can be based on the identification of the first auxiliary device matching the first auxiliary device type. A message server can forward a message from a first auxiliary device application to a first auxiliary device when the identification of the first auxiliary device matches a portion of the first auxiliary device type registered from the first auxiliary device application sending the message. Forwarding the message from the first auxiliary device application to the first auxiliary device can include forwarding the message to a first telemetry unit in communication with the first auxiliary device. The first telemetry unit can be identified as the first telemetry unit from which the identification of the first auxiliary device was received by the message server. Establishing a messaging link can also include forwarding a response message from the first auxiliary device to the first auxiliary device application based on the identification of the first auxiliary device matching the first auxiliary device type registered by the first auxiliary device application. Again, the first telemetry unit can forward the response message from the first auxiliary device to the message server for forwarding to the first auxiliary device application.

The instructions 236, when executed by a processor 222, can cause the message server 204 to establish a second messaging link between the second auxiliary device application and the second auxiliary device to be controlled. Establishing the second messaging link can be based on the identification of the second auxiliary device matching the second auxiliary device type. A message server can forward a message from a second auxiliary device application to a second auxiliary device when the identification of the second auxiliary device matches a portion of the second auxiliary device type registered from the second auxiliary device application sending the message. Forwarding the message from the second auxiliary device application to the second auxiliary device can include forwarding the message to a second telemetry unit in communication with the second auxiliary device. The second telemetry unit can be identified as the second telemetry unit from which the identification of the second auxiliary device was received by the message server. Establishing a second messaging link can also include forwarding a response message from the second auxiliary device to the second auxiliary device application based on the identification of the second auxiliary device matching the second auxiliary device type registered by the second auxiliary device application. Again, the second telemetry unit can forward the response message from the second auxiliary device to the message server for forwarding to the second auxiliary device application.

The message server 204, can include fewer or more instructions than are illustrated in FIG. 2. For example, the message server 204, or another server, can include additional instructions that, when executed by a processor 222, can cause the message server 204 to generate a map. The map can include the physical positions and locations of the first telemetry unit, the first auxiliary device, the second telemetry unit, and the second auxiliary device within a spread of towable equipment. The physical positions and locations can be determined based on the first position indicator of the first telemetry unit and the second position indicator of the second telemetry unit registered with the message server.

Figure 3:
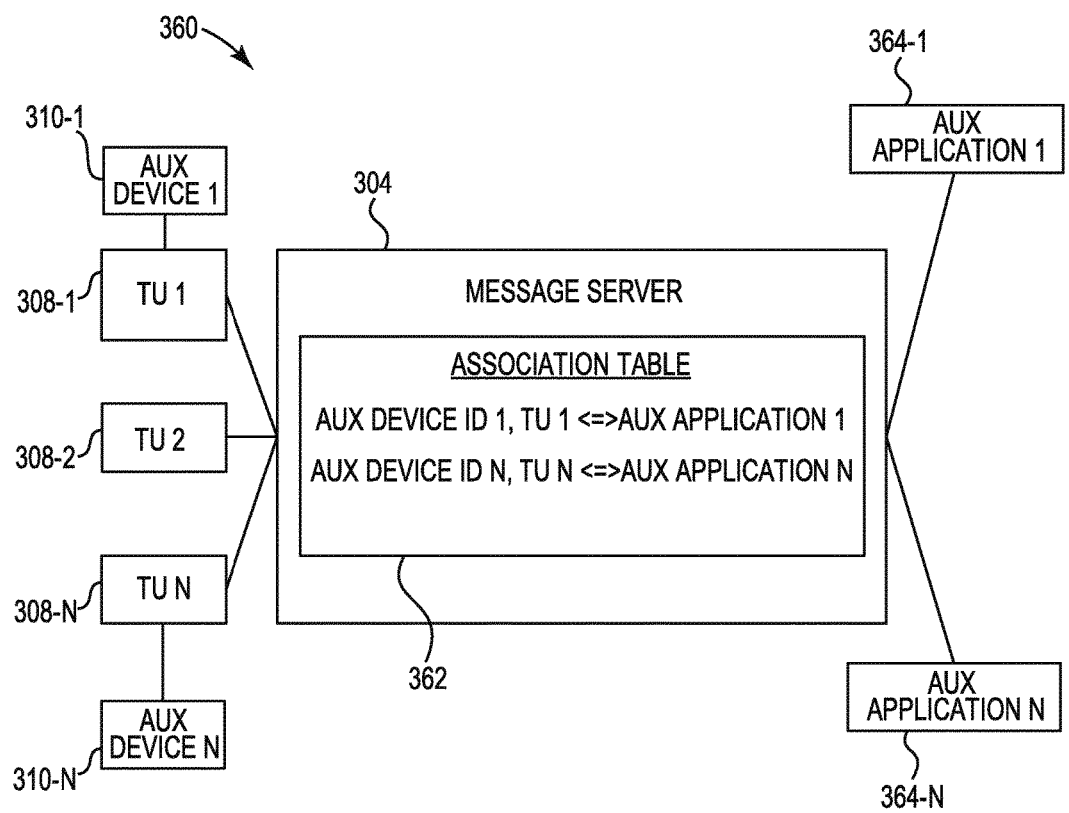
FIG. 3 is a block diagram of a marine survey communication system.

FIG. 3 illustrates a block diagram of a marine survey communication system 360 for marine surveying. The marine survey communication system 360 can include auxiliary devices 310-1 . . . 310-N, telemetry units 308-1, 308-2, . . . , 308-N, a message server 304, an association table 362, and auxiliary device applications 364-1 . . . 364-N. The message server 304 can be a computing device and/or instructions executable by a processor to facilitate communication between auxiliary device applications 364 and auxiliary devices 310. For example, the message server can include processing resources, such the processor 222 described with regard to message server 204, and memory resources, such the computer readable medium 224 described with regard to message server 204, coupled to the processing resources and storing instructions executable by the processing resources to perform the various functions described below. The message server 304 can utilize messaging protocols such as message queueing telemetry transport (MQTT) protocol, an advance message queueing protocol (AMQP), a ZeroMQ message transport protocol (ZMTP), and a custom protocol.

The message server 304 can include instructions executable by a processing resource to receive an identification of a first auxiliary device 310-1. The first auxiliary device 310-1 can be located on towable equipment. For example, the first auxiliary device 310-1 can be associated with a streamer. The first auxiliary device 310-1 can be coupled to a streamer, coupled to a receiver on a streamer, or coupled to a source. The identification of the first auxiliary device 310-1 can be reported from a first telemetry unit 308-1 in communication with the first auxiliary device 310-1. For example, the identification of the first auxiliary device 310-1 can be included in a report from the first telemetry unit 308-1 to the message server 304. The report can be a report of the discovery of the first auxiliary device 310-1 by the first telemetry unit 308-1. The report can also include a position indicator associated with the first telemetry unit 308-1. The first telemetry unit 308-1 can receive the identification of the first auxiliary device 310-1 responsive to the coupled first auxiliary device 310-1 receiving power. The first telemetry unit 308-1 can generate the report responsive to receiving the identification from the first auxiliary device 310-1.

The message server 304 can include instructions executable by a processing resource to receive an identification of a second auxiliary device 310-N. The second auxiliary device 310-N can also be located on towable equipment. The identification of the second auxiliary device 310-N can be reported from a second telemetry unit 308-N in communication with the second auxiliary device 310-N. For example, the identification of the second auxiliary device 310-N can be included in a report from the second telemetry unit 308-N to the message server 304. The report can be a report of the discovery of the second auxiliary device 310-N by the second telemetry unit 308-N. The report can also include a position indicator associated with the second telemetry unit 308-N. The second telemetry unit 308-N can receive the identification of the second auxiliary device 310-N responsive to the coupled second auxiliary device 310-N receiving power. The second telemetry unit 308-N can generate the report responsive to receiving the identification from the second auxiliary device 310-N.

The message server 304 can include instructions executable by a processing resource to receive an identification of a first auxiliary device type from a first auxiliary device application 364-1. Responsive to operation of an auxiliary device application 364 being initiated, the auxiliary device application 364 can transmit an identification of a first auxiliary device type. The identification of the first auxiliary device type can be a designation of a type of or a specific one of a plurality of auxiliary devices 310 that are controllable by the first auxiliary device application 364-1. The identification of the first auxiliary device type can be a designator that is substantially identical or partially identical to the identification of the first auxiliary device 310-1 reported to the message server 304 by the first telemetry unit 308-1.

The message server 304 can include instructions executable by a processing resource to receive an identification of a second auxiliary device type from a second auxiliary device application 364-N. Responsive to operation of a second auxiliary device application 364-N being initiated, the second auxiliary device application 364-N can transmit an identification of a second auxiliary device type. The identification of the second auxiliary device type can include a designation of a type of or a specific one of a plurality of auxiliary devices 310 that are controllable by the second auxiliary device application 364-N. The identification of the second auxiliary device type can be a designator that is substantially identical or partially identical to the identification of the second auxiliary device 310-N reported to the message server 304 by the second telemetry unit 308-N.

The message server 304 can include instructions executable by a processing resource to exchange messages between the first auxiliary device application 364-1 and the first telemetry unit 308-1 responsive to a correlation between the identification of the first auxiliary device 310-1 and the identification of the first auxiliary device type received from the first auxiliary application 364-1. For example, the message server 304 can include instructions executable by a processing resource to forward a message from a first auxiliary application 364-1 to a first telemetry unit 308-1 based on the identification of the first auxiliary device 310-1 reported by the first telemetry unit 308-1 matching a portion of the identification of the first auxiliary device type reported to the message server 304 by the first auxiliary device application 364-1. Further, the message server 304 can include instructions executable by a processing resource to forward a response message, received from a first auxiliary device 310-1 and forwarded through a first telemetry device 308-1, to the first auxiliary application 364-1 based on the identification of the first auxiliary device 310-1 reported by the first telemetry unit 308-1 matching a portion of the identification of the first auxiliary device type reported to the message server 304 by the first auxiliary device application 364-1.

The message server 304 can include instructions executable by a processing resource to exchange messages between the second auxiliary device application 364-N and the second telemetry unit 308-N responsive to a correlation between the identification of the second auxiliary device 310-N and the identification of the second auxiliary device type received from the second auxiliary application 364-N. For example, the message server 304 can include instructions executable by a processing resource to forward a message from a second auxiliary application 364-N to a second telemetry unit 308-N based on the identification of the second auxiliary device 310-N reported by the second telemetry unit 308-N matching a portion of the identification of the second auxiliary device type reported to the message server 304 by the second auxiliary device application 364-N. Further, the message server 304 can include instructions executable by a processing resource to forward a response message, received from a second auxiliary device 310-N and forwarded through a second telemetry device 308-N, to the second auxiliary application 364-N based on the identification of the second auxiliary device 310-N reported by the second telemetry unit 308-N matching a portion of the identification of the second auxiliary device type reported to the message server 304 by the second auxiliary device application 364-N.

The message server 304 can include instructions executable by a processing resource to construct a data structure such as an association table 362 to associate the identification of the first auxiliary device 310-1 and the first telemetry unit 308-1 with the identification of the first auxiliary device type reported by first auxiliary application 364-1. Further, the message server 304 can include instructions executable by a processing resource to construct an association table 362 to associate the identification of the second auxiliary device 310-N and the second telemetry unit 308-N with the identification of the second auxiliary device type reported by second auxiliary application 364-N. As such, the message server 304 can generate an association table 362 that serves as an end-to-end messaging exchange map, mapping an auxiliary device with an associated telemetry unit 308 and an auxiliary application 364 with an associated auxiliary device 310 such that a route for forwarding a message back and forth from an auxiliary device application 364 to a target auxiliary device 310 through an associated telemetry unit 308 is stored in the association table 362.

The message server 304 can include instructions executable by a processing resource to utilize the association table 362 to accomplish the message exchanges described above, For example, the message server 304 can include instructions executable by a processing resource to utilize the association table 362 to identify a telemetry unity 308 that reported an identification of an auxiliary device 310 that matches an auxiliary device type received from an auxiliary application 364 that originated a message being exchanged and vice versa.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system comprising:
   a message server including a processor and a memory resource; and
   a first and a second telemetry unit, each comprising hardware on towable equipment, in communication with the message server;
   wherein each telemetry unit is configured to:
      discover a respective identification of a respective auxiliary device, comprising hardware, on towable equipment coupled thereto;
      report the respective identification to the message server to be registered with the message server;
      request the message server to forward, from a respective auxiliary device application having registered with the message server a respective identification of a respective auxiliary device type, to receive commands from the respective auxiliary device application, matching the registered identification of the respective auxiliary device, commands executable by the respective auxiliary device, including a message identification correlated with the respective identification of the respective auxiliary device to the telemetry unit; and
      forward the commands received from the message server to the respective auxiliary device for execution thereby;
   wherein the message server is configured to generate a map of the first telemetry unit, the second telemetry unit, and the respective auxiliary devices in the towable equipment based on a first position indicator that describes a position of the first telemetry unit and a second position indicator that describes a position of the second telemetry unit; and
   wherein the first and the second position indicators are registered with the message server.

2. The system of claim 1, wherein each telemetry unit includes a common communication interface configured to be coupled to the respective auxiliary device.

3. The system of claim 1, wherein the first and the second telemetry units are coupled to the message server by a common physical communication link.

4. The system of claim 1, wherein the respective identification of the respective auxiliary device is assigned to the respective auxiliary device during manufacture of the respective auxiliary device.

5. The system of claim 1, wherein the respective identification of the respective auxiliary device includes a description of the respective type of the respective auxiliary device.

6. The system of claim 1, wherein each telemetry unit is configured to discover the respective auxiliary device responsive to power being applied to the respective auxiliary device.

7. The system of claim 1, wherein each telemetry unit, upon initialization thereof, is configured to report the position of the telemetry unit to the message server.

8. The system of claim 1, wherein the respective auxiliary device application is running on the message server.

9. The system of claim 1, wherein each telemetry unit is configured to forward the commands to the respective auxiliary device based on the respective identification without processing contents of the commands.

10. The system of claim 9, wherein each telemetry unit is configured to forward response messages from the respective auxiliary device to the message server without processing contents of the response messages.

11. The system of claim 9, wherein each telemetry unit is not configured with a protocol of the commands.

12. The system of claim 9, wherein the respective auxiliary device comprises at least one of an acoustic positioning device, towable equipment steering device, a tension measurement device, and a speed-of-sound device.

13. The system of claim 1, wherein the towable equipment is coupled to a marine survey vessel; and
wherein the message server is aboard the marine survey vessel.

14. A non-transitory computer-readable medium containing instructions executable by a processor to cause the processor to:
register, at a message server comprising hardware, an identification of a first auxiliary device, comprising hardware, on towable equipment discovered by and received from a first telemetry unit, comprising hardware, in communication with the first auxiliary device;
register, at the message server, an identification of a second auxiliary device, comprising hardware, on the towable equipment discovered by and received from a second telemetry unit, comprising hardware, in communication with the second auxiliary device;
register, at the message server, an identification, from a first auxiliary device application, of a first auxiliary device type to receive commands, executable by the first auxiliary device, from the first auxiliary device application;
register, at the message server, an identification, from the second auxiliary device application, of a second auxiliary device type to receive commands, executable by the second auxiliary device, from the second auxiliary device application;
establish a first messaging link between the first auxiliary device application and the first auxiliary device via the first telemetry unit based on the identification of the first auxiliary device matching the first auxiliary device type to receive the commands from the first auxiliary device; and
establish a second messaging link between the second auxiliary device application and the second auxiliary device via the second telemetry unit based on the identification of the second auxiliary device matching the second auxiliary device type to receive the commands from the second auxiliary device.

15. The medium of claim 14, wherein the instructions to establish the first messaging link comprise instructions to forward a message with a message identification that matches the identification of the first auxiliary device to the first telemetry unit.

16. The medium of claim 15, wherein the instructions to establish the first messaging link comprise instructions to forward a response message from the first auxiliary device to the first auxiliary device application based on the identification of the first auxiliary device matching the first auxiliary device type registered by the first auxiliary device application.

17. The medium of claim 14, further comprising instructions to register, with the message server, a first position indicator describing a position of the first telemetry unit in a spread of towable equipment and a second position indicator describing a position of the second telemetry unit in the spread of towable equipment.

18. The medium of claim 17, further comprising instructions to generate a map of the first telemetry unit, the first auxiliary device, the second telemetry unit, and the second auxiliary device in the spread of towable equipment based on the first position indicator and the second position indicator.

19. A message server, comprising:
processing resources; and
memory resources coupled to the processing resources and storing instructions executable by the processing resources to:
receive an identification of a first auxiliary device, comprising hardware on towable equipment, discovered by and reported from a first telemetry unit, comprising hardware, in communication with the first auxiliary device;
receive an identification of a second auxiliary device, comprising hardware on the towable equipment, discovered by and reported from a second telemetry unit, comprising hardware, in communication with the second auxiliary device;
receive, from a first auxiliary device application, an identification of a first auxiliary device type to receive commands, executable by the first auxiliary device, from the first auxiliary device application;
receive, from a second auxiliary device application, an identification of a second auxiliary device type to receive commands, executable by the second auxiliary device, from the second auxiliary device application;
exchange commands and responses between the first auxiliary device application and the first telemetry unit responsive to a correlation between the identification of the first auxiliary device and the identification of the first auxiliary device type to receive the commands from the first auxiliary device application; and
exchange commands and responses between the second auxiliary device application and the second telemetry unit responsive to a correlation between the identification of the second auxiliary device and the identification of the second auxiliary device type to receive the commands from the second auxiliary device application.

20. The message server of claim 19, further comprising instructions to construct an association table to associate the identification of the first auxiliary device and the first telemetry unit with the identification of the first auxiliary device type and to associate the identification of the second auxiliary device and the second telemetry unit with the identification of the second auxiliary device type.

21. The message server of claim 20, further comprising instructions to utilize the association table to identify a telemetry unit in communication with an auxiliary device having an identification that matches a message identification.

22. The message server of claim 19, further comprising instructions to receive a telemetry unit position indicator associated with the first telemetry unit as part of a report, from the first telemetry unit, of a discovery of the first auxiliary device.

\* \* \* \* \*